(12) United States Patent
Gangadharan et al.

(10) Patent No.: US 9,648,049 B2
(45) Date of Patent: May 9, 2017

(54) SYSTEM AND METHOD FOR EXTENDING IP MULTIMEDIA SUBSYSTEM TO HTML5 ENVIRONMENTS

(71) Applicant: Oracle International Corporation, Redwood Shores, CA (US)

(72) Inventors: Binod Pankajakshy Gangadharan, Bangalore (IN); Phelim O'Doherty, San Francisco, CA (US); Sharath Rajasekar, San Jose, CA (US); Boris Selitser, Castro Valley, CA (US); Honggang Frank Zhu, Roswell, GA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 182 days.

(21) Appl. No.: 14/069,214

(22) Filed: Oct. 31, 2013

(65) Prior Publication Data

US 2014/0222893 A1   Aug. 7, 2014

Related U.S. Application Data

(63) Continuation-in-part of application No. 13/758,768, filed on Feb. 4, 2013.

(51) Int. Cl.
  *H04L 29/06* (2006.01)
  *H04L 29/08* (2006.01)
(52) U.S. Cl.
  CPC ........ *H04L 65/1016* (2013.01); *H04L 65/104* (2013.01); *H04L 65/105* (2013.01);
  (Continued)

(58) Field of Classification Search
  CPC . H04L 65/1016; H04L 65/104; H04L 65/105; H04L 65/1069; H04L 67/02; H04L 67/10; H04L 67/26
  See application file for complete search history.

(56) References Cited

U.S. PATENT DOCUMENTS

| 6,760,417 B1 | 7/2004 | Wallenius |
| 7,136,913 B2 | 11/2006 | Linderman |
| (Continued) | | |

FOREIGN PATENT DOCUMENTS

WO   2014007708   1/2014

OTHER PUBLICATIONS

Bea, WebLogic Network Gatekeeper, Architectural Overview, Version 3.0, Sep. 2007, 112 pages.
(Continued)

*Primary Examiner* — Michael C Lai
(74) *Attorney, Agent, or Firm* — Tucker Ellis LLP (57) ABSTRACT

The present invention provides a system and method for real-time communication signaling between HTML5 endpoints and the IMS Core of a telecommunication network. The method adapts complex signaling on the server-side into simple operations towards the Web. In an embodiment the system includes a network-side controller communicating over an Internet domain protocol with a client-side controller. The client-side controller provides a JavaScript API to encapsulate the signaling layer. The network-side controller includes session border control functionality, terminates Internet domain communications with the client-side, parses, and normalizes the Internet domain communications into an internal protocol suitable for communication with telecommunications network systems. The system thereby provides a dedicated signaling channel with session border
(Continued)

control for applications on the client to interact with telecommunications network services.

22 Claims, 5 Drawing Sheets

(52) U.S. Cl.
CPC .......... *H04L 65/1069* (2013.01); *H04L 67/02* (2013.01); *H04L 67/26* (2013.01)

(56) References Cited

U.S. PATENT DOCUMENTS

| | | | |
|---|---|---|---|
| 7,483,438 B2 | 1/2009 | Serghi et al. | |
| 7,716,240 B2* | 5/2010 | Lim | G06F 21/6227 707/781 |
| 8,060,604 B1* | 11/2011 | Breau | G06F 9/541 709/224 |
| 8,185,548 B2* | 5/2012 | Lim | G06F 21/6227 707/781 |
| 8,296,409 B2* | 10/2012 | Banerjee | H04L 65/1016 709/205 |
| 8,630,299 B1 | 1/2014 | Afshar | |
| 9,038,082 B2* | 5/2015 | Maes | G06F 9/541 709/203 |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2005/0262075 A1 | 11/2005 | Beartusk | |
| 2006/0248198 A1 | 11/2006 | Galchev | |
| 2007/0106801 A1 | 5/2007 | Jansson | |
| 2007/0143470 A1 | 6/2007 | Sylvain | |
| 2007/0156659 A1* | 7/2007 | Lim | G06F 21/6227 |
| 2008/0103923 A1 | 5/2008 | Rieck et al. | |
| 2008/0189421 A1 | 8/2008 | Langen | |
| 2008/0271113 A1 | 10/2008 | Belling | |
| 2009/0141704 A1* | 6/2009 | Eng | H04L 12/66 370/352 |
| 2009/0225760 A1 | 9/2009 | Foti | |
| 2009/0265607 A1 | 10/2009 | Raz | |
| 2009/0268715 A1 | 10/2009 | Jansson | |
| 2010/0114994 A1* | 5/2010 | Huang | G06F 17/2247 707/811 |
| 2010/0142515 A1* | 6/2010 | Jana | H04L 65/1069 370/352 |
| 2010/0183131 A1* | 7/2010 | Chang | G06Q 30/02 379/93.12 |
| 2010/0223287 A1* | 9/2010 | Lim | G06F 21/6227 707/769 |
| 2011/0072144 A1 | 3/2011 | Fikouras | |
| 2011/0082920 A1 | 4/2011 | Bhattacharya et al. | |
| 2011/0107156 A1 | 5/2011 | Miyata | |
| 2011/0209181 A1 | 8/2011 | Gupta | |
| 2011/0258305 A1* | 10/2011 | Chen | H04L 12/1813 709/223 |
| 2011/0258597 A1* | 10/2011 | Chen | H04L 65/1006 717/107 |
| 2012/0016932 A1* | 1/2012 | de Castro, Jr. | H04L 65/1043 709/203 |
| 2012/0045040 A1* | 2/2012 | Maes | H04L 63/0815 379/67.1 |
| 2012/0072548 A1* | 3/2012 | Kim | H04L 61/1535 709/219 |
| 2012/0144416 A1 | 6/2012 | Wetzer | |
| 2012/0151373 A1 | 6/2012 | Kominac | |
| 2012/0178420 A1 | 7/2012 | Ould | |
| 2012/0233216 A1* | 9/2012 | Lim | G06F 21/6227 707/781 |
| 2012/0317474 A1* | 12/2012 | Parreira | G06F 17/30896 715/234 |
| 2013/0013804 A1* | 1/2013 | Traynor | H04L 67/26 709/232 |
| 2013/0042152 A1 | 2/2013 | Fryc | |
| 2013/0058262 A1* | 3/2013 | Parreira | G06F 17/2247 370/276 |
| 2013/0067333 A1* | 3/2013 | Brenneman | G06F 17/30796 715/721 |
| 2013/0073393 A1 | 3/2013 | Nasr | |
| 2013/0094445 A1* | 4/2013 | De Foy | H04L 45/021 370/328 |
| 2013/0097239 A1* | 4/2013 | Brown | H04L 67/02 709/204 |
| 2013/0104030 A1* | 4/2013 | Parreira | G06F 17/2247 715/234 |
| 2013/0232217 A1* | 9/2013 | Kristiansson | H04L 69/08 709/213 |
| 2014/0007083 A1* | 1/2014 | Baldwin | H04L 65/1016 717/178 |
| 2014/0026120 A1* | 1/2014 | Gu | G06F 11/3684 717/124 |
| 2014/0040437 A1 | 2/2014 | Mitsuya | |
| 2014/0044123 A1* | 2/2014 | Lawson | H04L 65/1023 370/352 |
| 2014/0075472 A1 | 3/2014 | Mitsuya | |
| 2014/0095724 A1 | 4/2014 | Yoakum | |
| 2014/0126714 A1* | 5/2014 | Sayko | H04M 3/5191 379/265.09 |
| 2014/0156725 A1* | 6/2014 | Mandyam | H04L 67/02 709/203 |
| 2014/0181949 A1* | 6/2014 | Hunter | H04L 12/413 726/11 |
| 2014/0195588 A1 | 7/2014 | Badge | |
| 2014/0280522 A1* | 9/2014 | Watte | H04L 51/04 709/203 |
| 2015/0022619 A1 | 1/2015 | Figueiredo Carvalho | |
| 2015/0195309 A1* | 7/2015 | Opsenica | H04L 65/1006 709/228 |

OTHER PUBLICATIONS

Chen et al., Applying SOA and Web 2.0 to Telecom: Legacy and IMS Next-Generation Architecutre, IEEE, 2008, 6 pages.
Oracle, Oracle Communication Services Gatekeeper Concepts and Architectural Overview, Release 4.1, Jan. 2009, 94 pages.
Ericson, et al., JSR 309 Overview of Media Server Control API, Version: Media Server Control API v1.0, Sep. 30, 2009, 87 pages, Hewlett-Packard Development Company, L.P.
Kulkarni, et al., SIP Servlet Specification, Version 1.1, JSR 289 Expert Group, Aug. 1, 2008, 240 pages, BEA Systems, Inc.
United States Patent and Trademark Office, Office Action Dated May 19, 2016 for U.S. Appl. No. 14/069,263, 17 Pages.
United States Patent and Trademark Office, Office Action Dated Jun. 9, 2016 for U.S. Appl. No. 14/069,236, 14 Pages.

\* cited by examiner

SYSTEM AND METHOD FOR EXTENDING IP MULTIMEDIA SUBSYSTEM TO HTML5 ENVIRONMENTS

CLAIM OF PRIORITY

This patent application is a continuation-in-part continuation of U.S. patent application Ser. No. 13/758,768, entitled "Real-Time Communication Signaling Gateway" filed Feb. 4, 2013 (Inventors: Honggang frank Zhu, Boris Selitser, and Karthic Loganathan), which application is incorporated herein by reference in its entirety.

RELATED CASES

This patent application is related to the following patent applications, which are hereby incorporated by reference in their entirety:

U.S. Patent Application titled "JAVASCRIPT API FOR WEBRTC", application Ser. No. 14/069,236, filed Oct. 31, 2013;

U.S. Patent Application titled "INTEGRATED WEB-ENABLED SESSION BORDER CONTROLLER", application Ser. No. 14/069,246, filed Oct. 31, 2013, now U.S. Pat. No. 9,473,581, issued Oct. 18, 2016;

U.S. Patent Application titled "BROWSER/HTML FRIENDLY PROTOCOL FOR REALTIME COMMUNICATION SIGNALING", application Ser. No. 14/069,308, filed Oct. 31, 2013, now U.S. Pat. No. 9,331,967, issued May 3, 2016;

U.S. Patent Application titled "GENERIC MODEL FOR CUSTOMIZING PROTOCOL BEHAVIOR THROUGH JAVASCRIPT", application Ser. No. 14/069,297, filed Oct. 31, 2013, now U.S. Pat. No. 9,307,031, issued Apr. 5, 2016; and U.S. Patent Application titled "JAVA API FOR PROGRAMMING WEB REAL TIME COMMUNICATION APPLICATIONS", application Ser. No. 14/069,263, filed Oct. 31, 2013, now U.S. Pat. No. 9,509,745, issued Nov. 29, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a system and method for extending telecommunications networks to the web environment. In particular, the present invention relates to extending IP Multimedia Subsystem as utilized by telecommunications networks, to the web environment.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lower the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

The IP Multimedia Subsystem (IMS) is an architecture for an integrated network of telecommunications carriers that would facilitate the use of IP (Internet Protocol) for packet communications in all known forms over wireless or landline. Examples of such packet communications include traditional telephony, fax, e-mail, Voice over IP (VoIP), instant messaging (IM), videoconference sessions and video on demand (VoD). IMS uses a Voice-over-IP (VoIP) and runs over the standard Internet Protocol (IP). IMS gives network operators and service providers the ability to control and charge for each service. IMS architecture has the capability to support existing phone systems (both packet-switched and circuit-switched). Thus, IMS provides the interoperability, security, session management and QoS capabilities that telecommunications providers lack and desire. IMS is the de facto standard for next-generation networks.

HyperText Markup Language (HTML) is the main markup language for creating web pages and other information that can be displayed in a web browser. HTML is written in the form of HTML elements consisting of tags. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The HTML environment has a well known behavior according to standards established by the World Wide Web Consortium (W3C) which is the main international standards organization for the World Wide Web (abbreviated WWW or W3).

HTML5 introduced WebRTC application programming interfaces (APIs) that make it possible for applications that use JavaScript in an HTML5 environment to take part in real-time communications. To make use of this capability, applications that reside in the browser environment of one user need to exchange messages with another application to establish media connections. However, the signaling process of exchanging and negotiating session information is not specified by W3C and is left to the application to implement. The problem is more complicated if it is desired to make a connection with a non-browser media endpoint like a traditional telephony equipment.

It would be desirable to access the network services available in the IP Multimedia Subsystem (IMS) from the HTML environment, and in particular, the HTML environments capable of real-time communication, for example HTML5, However extending IMS architecture to the HTML environment is difficult owing to incompatibility of SIP with HTTP over TCP/IP and the requirement for domain expertise to overcome such incompatibility. There is presently no simple way to extend the network services of the IP Multimedia Subsystem (IMS) to HTML5 applications without radical changes to the IMS model and custom extensions to the HTML platform to permit a browser to be used as an endpoint for IMS services. Thus, despite the desire to extend the enhanced capabilities that IMS provides to the HTML environment, such integration has not been readily feasible.

It would therefore be desirable to provide a system and method for extending IMS architecture to the HTML environment which is effective and simple to implement.

It would further be desirable to provide a system and method for extending IMS architecture to the HTML environment without radical changes to the IMS model or custom extensions to the HTML platform.

It would further be desirable to provide a system and method for extending IMS architecture to the HTML environment which can be implemented without domain expertise.

SUMMARY

The present invention provides a system and method for extending IMS architecture to the HTML environment which overcomes the limitations of the state of the art.

The present invention provides a system and method for extending IMS architecture to the HTML environment which is effective and simple to implement.

The present invention provides a system and method for extending IMS architecture to the HTML environment without radical changes to the IMS model or custom extensions to the HTML platform.

The present invention provides a system and method for extending IMS architecture to the HTML environment which can be implemented without domain expertise.

In an embodiment, the system and method of the present invention provide a communication channel between an HTML-capable application or operating system and the IMS core of a telecommunications network. The system and method overcome the need for domain expertise of complex SIP and other communications centric protocols. The system and method provide a mechanism to combine complex signaling in the IMS telecommunications network into simple operations towards the Web. The present invention thereby provides a platform which enables telecommunications providers to provide a better end-to-end customer experience accessible from a wide variety of HTML-capable consumer devices.

In an embodiment, the system and method of the present invention comprise a client-side controller, a network-side controller, and a communications protocol for communicating between the client-side controller and the network-side controller. The client-side controller provides a client-side JavaScript API to interface with the HTML-capable application or operating system and encapsulate the HTTP signaling layer. The network-side controller terminates the communications with the client-side, and parses and normalizes the communications into an internal protocol suitable for communication with IMS within legacy telecommunications network systems (for example SIP and the like). The communications protocol provides a communication channel which is compatible with transmission over the Internet domain. The system and method thereby provides a dedicated "signaling" channel for all the applications on the client to interact with the IMS of telecommunications network services.

Other objects and advantages of the present invention will become apparent to those skilled in the art from the following detailed description of the various embodiments, when read in light of the accompanying drawings.

DETAILED DESCRIPTION:

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Figure 1:
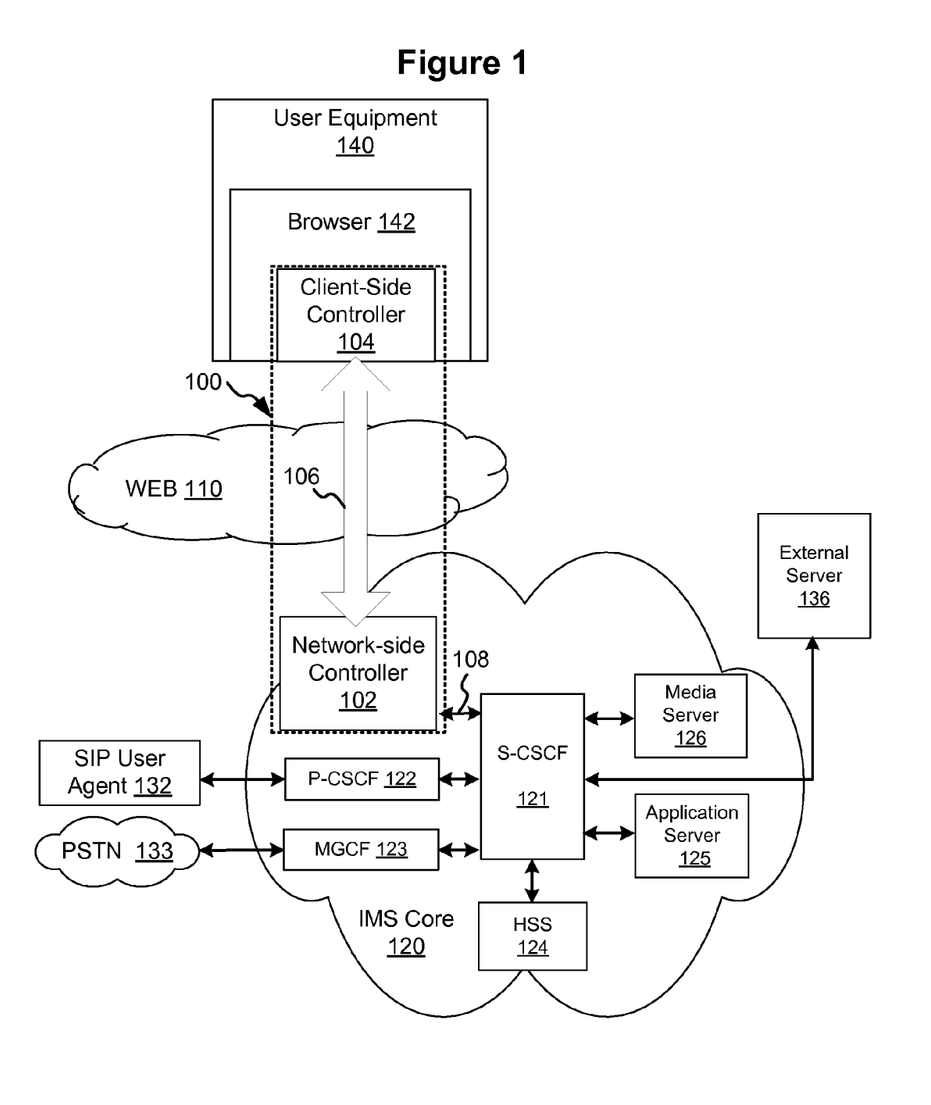
FIG. 1 shows an overview of a system for extending IP Multimedia Subsystem to HTML environments according to an embodiment of the present invention.

FIG. 1 shows an overview of a system and method for extending IP Multimedia Subsystem to HTML environments according to an embodiment of the present invention. As shown in FIG. 1, the system and method of the present invention 100, comprises a client-side controller 104, a network-side controller 102, and a communications protocol 106 for communicating between the client-side controller 104 and the network-side controller 102. The client-side controller 104, operating on User equipment 140, provides a client-side JavaScript API to encapsulate the HTTP signaling layer. The network-side controller 102 terminates the Internet domain communications with the client-side, and parses and normalizes the Internet domain communications into an internal protocol 108 suitable for communicating with elements of the IMS Core 120 within legacy telecommunications network systems (for example SIP and the like). The communications protocol 106 provides a communication channel which is compatible with communications over the Internet domain 110. The system and method thereby provides a dedicated "signaling" channel for the HTML-capable applications/operating system on the User Equipment 140 to interact with the IMS Core 120 of the telecommunications network.

User equipment 140 represents any HTML-capable device, including for example computing devices such as personal computers, laptops, desktops, notebooks, netbooks, tablets, mobile phones, and e-book readers. Moreover, HTML capabilities are being added to consumer devices, such as appliances, automobiles, set-top boxes, amplifiers, audio-visual components, televisions, projectors, and the like. HTML capabilities may be provided by a browser, for example, Safari, Firefox, Chrome Browser, and Internet Explorer. Alternatively, HTML capabilities may be a core component of the operating system, for example Chrome OS.

IMS Core 120 (IP Multimedia Subsystem or IP Multimedia Core Network Subsystem) is an architectural framework for delivering IP multimedia services. As shown in FIG. 1 IMS Core 120 comprises: S-CSCF 121; P-CSCF 122; MGCF 123; HSS 124; Application Server 125; and Media Server 126. These elements are shown as an example of conventional IMS architecture. IMS Core 120 may contain additional and/or different elements depending upon the implementation of a particular network. The present invention is not limited to any particular implementation of IMS Core 120. Indeed, it is a feature of the present invention that it extends whatever features are present in IMS Core to the Internet domain.

To ease the integration with the Internet, IMS uses IETF protocols wherever possible, e.g., Session Initiation Protocol (SIP). IMS Core 120 includes network elements designed to interact with SIP User Agents 132 and PSTN 133. As used herein, a user agent is an SIP endpoint that can be considered anything that either originates or terminates a SIP session, e.g., SIP Phones, Soft Phones, and the like. Typically such devices must be specifically designed to implement SIP in order to function as SIP User Agents 132. In addition the IMS Core 120 can exchange signaling and media messages with a public switched telephone network (PSTN) 133. IMS Core 120 facilitates access to multimedia and voice applications from wireless and wireline terminals to create a form of fixed-mobile convergence (FMC). This is done by having a horizontal control layer that isolates the access network from the service layer. From a logical architecture perspective, services need not have their own control functions, as the control layer is a common horizontal layer.

Referring again to the IMS Core 120 shown in FIG. 1, P-CSCF 122 represents the proxy call session control function which is an entry point for a SIP user agent 132, and authenticates users and establishes IP security integration with the SIP user agent 132. Media gateway controller function (MGCF) 122 is the entry point for signaling and media messages transmitted via public switched telephone network (PSTN) 133. MGCF 123 and P-CSCF 122 are used to process ingoing and outgoing SIP signaling packets in the IMS Core 120. On the network-side, MGCF 123 and P-CSCF 122 interact with S-CSCF 121 using Session Initiation Protocol (SIP).

S-CSCF 121 is the central node of the signaling plane. It is a SIP server, but also performs session control. S-CSCF 121 is located in the home network. It uses Diameter Cx and Dx interfaces to the Home Subscriber Server (HSS) 124 to download user profiles and upload user-to-S-CSCF associations. All necessary subscriber profile information is loaded from the HSS 124. S-CSCF 121 inspects every message from the SIP user agent 132 and/or other network elements, and decides where the SIP message should be forwarded for service provision. An Application Server AS 125 hosts and executes services, and interfaces with the S-CSCF 121 using SIP. Additionally a media server 126 provides media related functions such as media manipulation, e.g. voice stream mixing and interfaces with the S-CSCF 121 using SIP. S-CSCF 121 may also allow for provisioning of services and/or media services from an external server 136.

As described above, the elements of IMS Core 120 communicate with the central node of the signaling plane S-CSCF 121 using Session initiation Protocol (SIP). However SIP is not easily compatible with conventional protocols for transmission over the Web 110. Integration of IMS Core 120 is therefore difficult owing to incompatibility of protocols used in the two different environments and the requirement for domain expertise to overcome such incompatibility. The present invention provides a solution to such problems and therefore allows for extending the IMS Core 120 to the Web 110.

Network-side controller 102 is an entry point for HTTP traffic from Web 110. Network-side controller 102 terminates Internet domain communications with the client-side, and parses and normalizes the Internet domain communications into an internal protocol 108 suitable for communicating with elements of the IMS Core 120 (e.g. S-CSCF 121) within legacy telecommunications network systems (for example SIP and the like). Network-side controller 102 communicates with client-side controller using a protocol 106 adapted to meet the real-time signally requirements of SIP while remaining compatible with transmission over Web 110. The client-side controller 104 operating on User equipment 140 provides client-sideJavaScript APIs to interface with HTML-capable applications/operating systems and encapsulate the HTTP signaling layer. The system and method 100 thereby provides a dedicated "signaling" channel for all the HTML-capable applications/OS on the User Equipment 140 to interact with the IMS Core 120 of the telecommunications network.

From an IMS network perspective, network-side controller 102 sits in the edge of IMS core 120 and is architecturally parallel to a P-CSCF. While P-CSCF is the entry point (many times along with a Session Border Controller) for the SIP endpoints, network-side controller 102 serves as the entry point for HTML5 endpoints. Thus, network-side controller 102 has the ability to leverage applications in the IMS application server 125 instead of hosting a separate/custom business application on its own thus greatly simplifying integration with IMS Core 120. For example, for a conference server, the network-side controller 102 would intelligently hand the requests to a backend IMS application server 125. The conference application would then route the requests to an appropriate media mixer and run the conference.

Further details of one possible implementation of the system and method of the present invention 100 are described below with respect to FIGS. 2A-2D, in which Network-side controller 102 is implemented as Oracle™ WebRTC Session Controller (WSC) 216, Client side controller 104 is implemented as RTC Client Signaling Controller 222, and protocol 106 is implemented in JavaScript Object Notation (JSON).

Figure 2A:
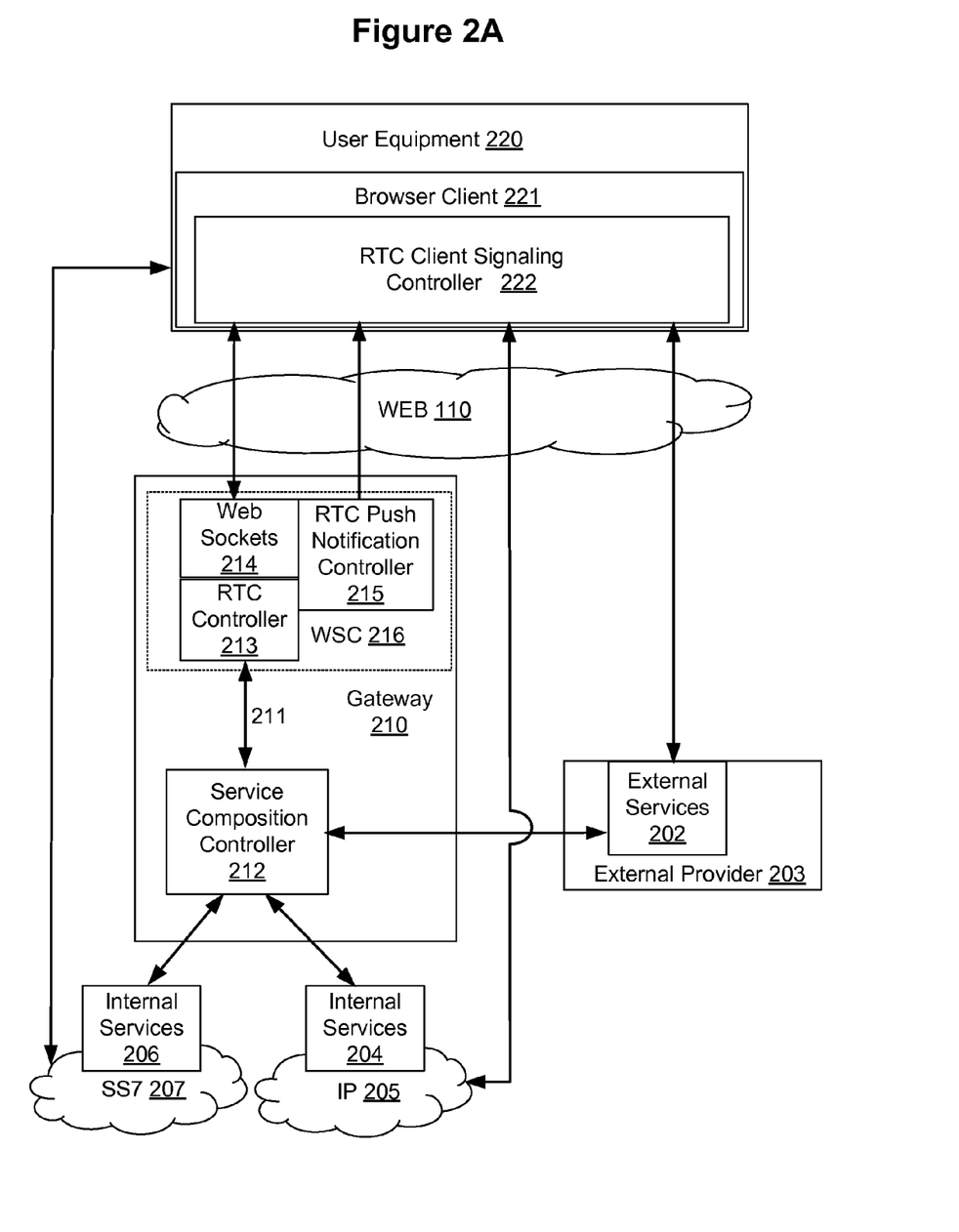
FIG. 2A shows a system for real-time communication signaling according to an embodiment of the present invention.

FIG. 2A shows a gateway 210 for real-time communication signaling according to an embodiment of the present invention. As shown in FIG. 2A, Gateway 210 includes RTC Controller 213, RTC Push Notification Controller 215, and Service Composition Controller 212. RTC Controller 213 and RTC Push Notification Controller 215 interact with RTC Client Signaling Controller 222 over the Web 110. RTC Controller 213 communicates internally 211 using SIP with Service Composition Controller 212. Service Composition Controller 212 mediates provision of Internal Services 206, 204 and External Services 202 of an External Provider 203. RTC Push Notification Controller 215, RTC Controller 213 and WebSocket Interface 214 together comprise an embodiment of WSC 216.

RTC Controller 213 provides scalable signaling over HTTP web-centric protocols for communicating over Web 110 with RTC Client Signaling Controller 222. RTC Controller 213 communicates with RTC Client Signaling Controller 222 via WebSocket interface 214. RTC Controller 213 provides a highly available, encapsulated front end interface to the web developer. The RTC Controller 213 terminates the Internet domain communications with the client-side by managing the WebSocket connections. The RTC Controller 213 also parses and processes the Internet domain communications. The RTC Controller 213 normalizes the Internet domain communications into an internal SIP for communication within Gateway 210. Thus, RTC Controller 213 communicates internally with Service Composition Controller 212 using a binary SIP.

Service Composition Controller 212 provides for service composition and orchestration across domains and different providers. The Service Composition Controller 212 also provides a unified layer to inject charging and policy control for differentiated service offerings. In an embodiment the functionality of Service Composition Controller 212 can be integrated into a converged application server, for example Oracle™ Communications Converged Application Server (OCCAS). Alternatively, the functionality of Service Composition Controller 212 can be integrated into a service controller, for example Oracle™ Communications Service Controller (OCSC).

Service Composition Controller 212 adopts and reuses existing internal communication services with support for different signaling protocols. Thus, for example, Service Composition Controller 212 can mediate: Internal Services 206 providing network telephony signaling using the SS7 protocol 207; and Internal Services 204 providing services using internet protocol 205.

Service Composition Controller 212 can also mediate the provision of external services 202 provided by an external service provider 203. Communication with external provider 203 can be conducted using a selected signaling protocol SIP, XMPP etc. as required by the external provider 203. Services provided by external provider 203 can include web services provided over Web 110 to a browser client 221 on user equipment 220. Service Composition Controller 212 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment.

The gateway system acts as the IMS proxy for both HTML5 and external providers by taking advantage of WebSocket technology, to enable and expedite the IMS deployment. The WebSocket Protocol defines a mechanism for fast, secure, two-way communication between a client and a server over the Web. Data is transferred over a full-duplex single socket connection, allowing messages to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed.

RTC Client Signaling Controller 222 is resident on user equipment 220 and manages multiplexing of signaling request/response for all client-side applications mediating communication with RTC Controller 213 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client.

For telephony applications low power consumption by user equipment 220 is desirable. Accordingly RTC Client Signaling Controller 222 can be placed in standby operation when not involved in signaling. Moreover WebSocket protocol must be initiated from the client-side and is also responsible for keeping the connection alive. Thus, the RTC Client Signaling Controller 222 will shut down the WebSocket Connection when there is no traffic. RTC Push Notification Controller 215 can be used by RTC Controller 213 to "wake-up" RTC Client Signaling Controller 222 from the standby state in order to resume communication. The RTC Push Notification Controller 215 may, in some embodiments, also be used for other notifications such as call notifications, message notifications, and the like. In an alternative embodiment, the keepalive and pingpong capabilities of the WebSocket protocol may be used to maintain WebSocket connection.

RTC Push Notification Controller 215 includes a server-side HTTP connection based Push Notification to wake up the client-side signaling process. RTC Client Signaling Controller 222 can utilize any push notification mechanism and protocol effective for user equipment 220. For example, RTC Push Notification Controller 215 can utilize the SMS message system to activate RTC Client Signaling Controller 222, thereby causing RTC Client Signaling Controller 222 to reactivate the WebSocket connection with the RTC Controller 213.

Figure 2B:
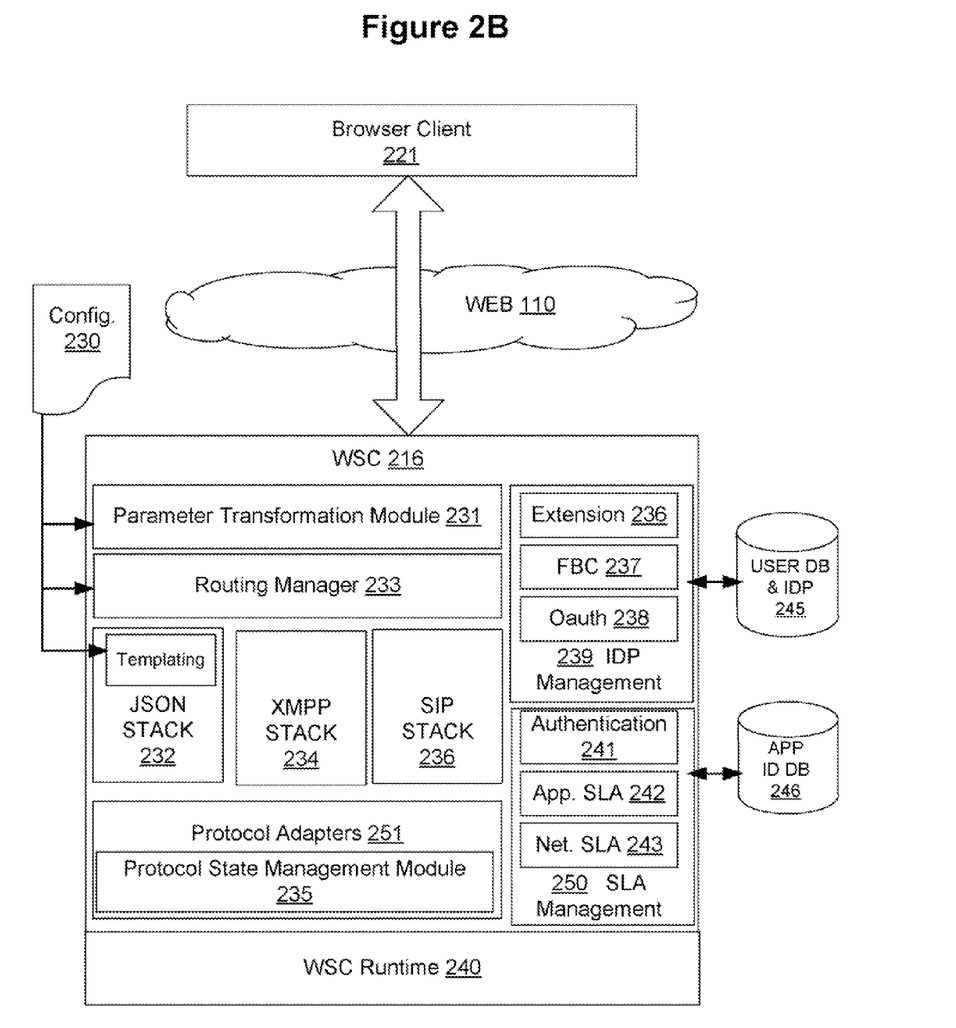
FIG. 2B shows a server-side WebRTC Session Controller (WSC) according to an embodiment of the invention.

FIG. 2B shows a server-side WSC 216 according to an embodiment of the invention. WSC 216 is deployed between the browser client 221 and the service composition controller 212 for exposing the internal and external services 206, 204, 202 to the client browser 221 (see FIG. 2A). WSC 216 enables the browser as a client for the network services and hence acts as a browser adapter. WSC 216 enables browser client management and ensures reliability of the service end to end (browser to network). WSC 216 provides a number of features to the carriers and enterprise customers as described below.

WSC 216 including WSC runtime module 240 supports multiple signaling protocols and ensures correct mapping of the signaling message using parameter transformation module 231 and correct routing of the messages based on routing profiles using routing manager 233. Parameter transformation, routing and JSON templating are all configurable using a configuration file 230.

WSC 216 performs protocol mapping between the selected client-side protocol and the network side protocol (SIP). For example, WSC is adapted to receive a JSON message, parse the SDP information and map it to other supported protocols (SIP/XMPP). WSC 216 maintains a data definition for the format to parse to. When the JSON request is received at WSC 216, the transformation between the data definition and the JSON message structure must be implemented.

WSC 216 acts as a cross protocol signaling engine. WSC 216 handles the protocol associated state as demanded by the protocol. When WSC 216 is acting as a cross-protocol gateway, for example, JSON/WebSocket to SIP, the SIP side of WSC 216 maintains the transaction and dialog state. WSC 216 includes a protocol state management module 235 which manages the protocol state and ensures state replication for reliability of message exchange. WSC 216 has the ability to manage enormous amounts of concurrent client connections in order to be able to scale to the applications and users on the web.

For developers, the key is to leverage existing knowledge and skill sets to minimize additional time and resources required by security features implementation. WSC 216 comes with APIs that support multiple platforms running under multiple protocols and a set of client libraries to facilitate smooth development process. WSC 216, thus, additionally provides an extensibility framework to extend the capabilities via protocol adaptors 251 and APIs for the web developers to call the WSC functions from their applications.

WSC 216 provides signaling adaption such that WSC 216 handles all the signaling between the browser client 221 and the network end point (SIP Proxy, PSTN Gateway for example). WSC 216 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the WSC supports translation into a suitable communication protocol or protocols (e.g. XMPP, SIP and the like). Thus, for example, on the network/carrier side, WSC 216 supports SIP (RFC 3261).

Security for real-time communication over the Web requires that the communicating endpoints be able to authenticate each other. While these end points are making calls through the signaling services, their identities are authenticated via an Identity Provider Management Module (IDP) 239 that supports OAuth 238, Facebook Connect (FBC) 237 and other Identity Protocols using extensions 297 (e.g. OpenID connect). IDP Management modules 239 interact with internal and/or external user database and identity servers 245.

WSC 216 thereby acts as an identity service that can attest the identity of the caller of the received request and map it to the "from" identity of the outbound call. For example, WSC 216 includes OAuth module 238 which introduces security functions that authenticate and authorize the browser-based applications to interact with the network services. WSC 216 thereby provides service providers with the ability to control any third party partner's access and usage of its network capabilities.

Establishing real-time communication over the Web also utilizes verification of service level agreements (SLA) for the user and application. SLA Management module 250 includes an authentication module 241, as well as an application SLA module 242 and network SLA module 243 which communicate with internal and/or external databases 246 to verify that the communications are provided in conformance with the relevant service level agreements for the user and application.

In a particular embodiment, WSC 216 defines a JavaScript Object Notation (JSON) protocol that is used for exchanging information and to control the set up of media between a browser client 221 and WSC 216. JSON is a lightweight data-interchange format; however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 221 and WSC 216. The JSON protocol defines the minimum set of messages and state machinery necessary to implement a plurality of signaling models, for example the SDP offer/answer model. The JSON protocol defines the message structure that accounts for the reliability (reconnect, retransmissions, timeouts etc.) of the message. The JSON protocol also handles the necessary headers to function in multilevel secure environment (security headers).

WSC 216 also provides an internal routing manager 233 for the routing of the requests to the appropriate end nodes based on variety of parameters. There are multiple WSC instances (see FIG. 2C) and each instance is connected to the network node serving the functionality. The incoming requests (JSON messages, for example) have to be routed to the right application and instance. WSC 216 uses routing manger 233 to route incoming requests based on their origination and destination. WSC 216 provides functionality including performing look-ups and route requests for JSON to SIP, JSON to XMPP, SIP to XMPP, XMPP to SIP. Each route in the WSC routing manager 233 has a routing profile. WSC 216 provides a default routing profile and additional routing profiles are configurable as needed or desired.

Figure 2C:
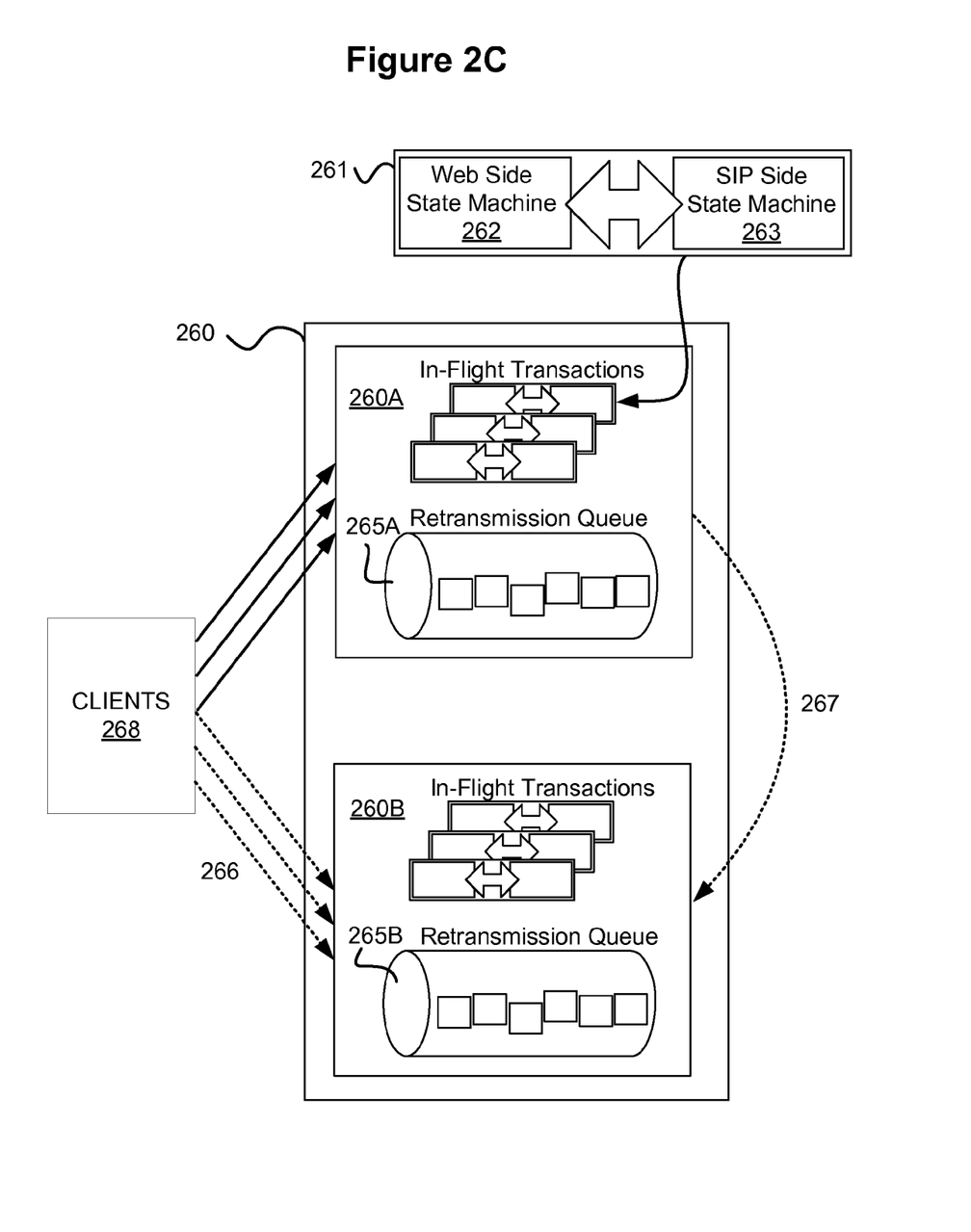
FIG. 2C shows an aspect of the WSC of FIG. 2B according to an embodiment of the invention.

FIG. 2C shows an aspect of WSC 216 of FIG. 2B according to an embodiment of the invention. WSC 216 maintains session control information, protocol state, dialog state, transaction state. WSC 216 provides for state maintenance and session state mapping across protocols. WSC 216 also enables hooks into the media session state. WSC 216 also maintains the SDP Agent information. WSC 216 operates to ensure reliable message exchange with clients 268.

WSC 216 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 265A, 265B allows for retransmission of messages for which there is an error or lack of acknowledgement.

One way in which WSC 216 maintains reliability is to keep the relevant conversation state redundant across different servers 260A, 260B having instances of WSC 216. WSC 216 provides for state maintenance and session state mapping across protocols. The relevant conversation state includes a Web Side State Machine 262 and SIP Side State Machine 263 for each In-Flight Transaction 261. WSC 216 maintains the session states (both client and server side state) in the cache. In order to ensure reliability, the cached copy of the state machines is duplicated on several servers. Additionally retransmission queue 265A, 265B is duplicated across servers 260A, 260B. WSC 216 uses coherence for state storage and management. If a server, for example server 260A cannot be contacted due to a network failure WSC 216 ensures that the state is retrieved from another active server 260B as shown by the dashed arrows 267, 266.

Figure 2D:
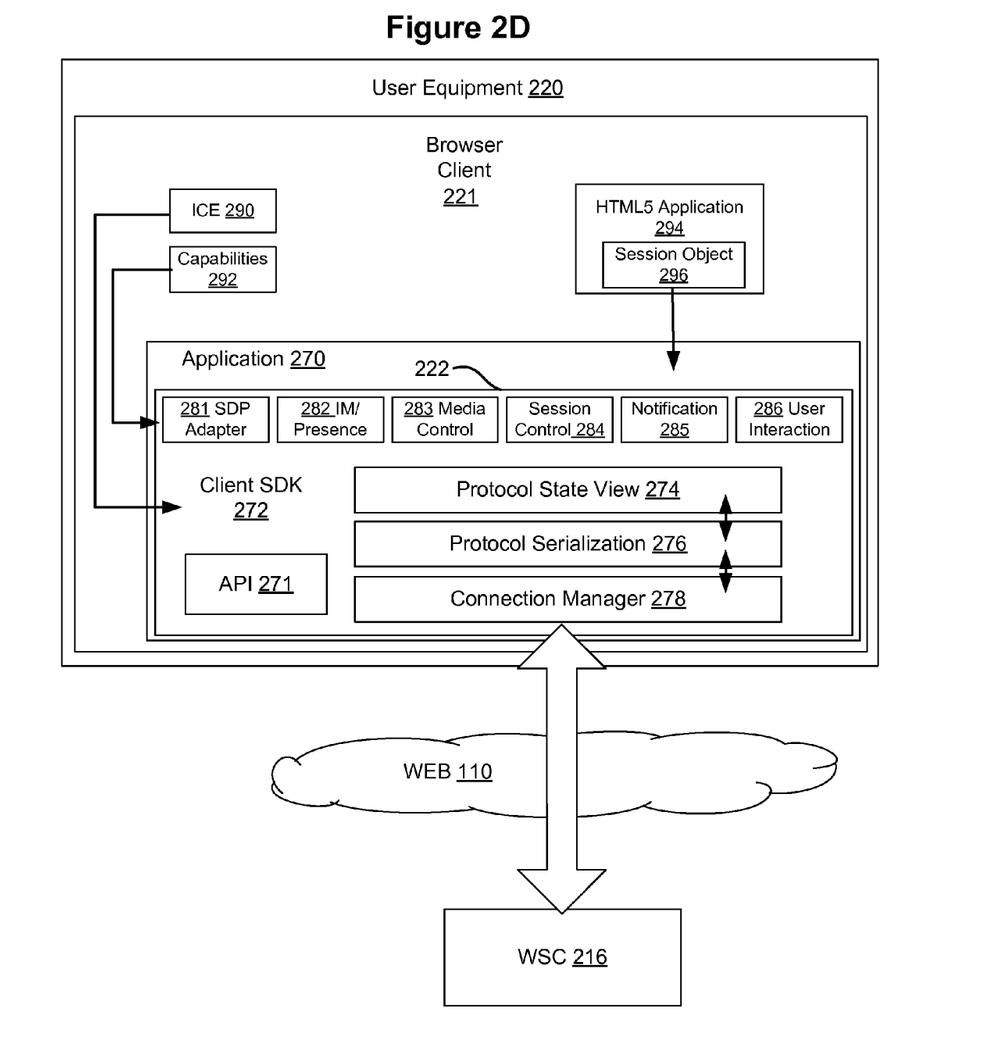
FIG. 2D shows a client-side RTC signaling controller according to an embodiment of the invention.

FIG. 2D shows an implementation of a client-side RTC signaling controller 222 as shown in FIG. 2A according to an embodiment of the invention. In an embodiment client-side RTC signaling controller 222 is implemented as part of an application 270 running on a browser client 221 (for example a JSS/CSS/HTML5 application). Application 270 is resident on user equipment 220 such that RTC signaling controller 222 manages multiplexing of signaling request/response for all client-side applications mediating communication with WSC 216 (see FIGS. 2A and 2B). Application 270 includes SDP Adapter 281, IM/presence module 282, media control module 283, Session Control 284, notification module 285, and user interaction module 286.

In an embodiment application 270 is a JavaScript Application. Application 270 operates at a high level without having to deal with peer connection directly. The browser client 221 is stateless and contains as little of the implementation of the transport establishment code as possible. Browser client 221 identifies the capabilities 292 of the browser client 221 and user equipment 220 for streaming media. The capabilities 292 are provided to the SDP adapter 281 of the application 270. SDP adapter 281 provides a description of streaming media initialization parameters—a session profile—suitable for streaming media to the browser client 221 running on user equipment 220.

A client-side library of available protocols is provided as part of a Client SDK 272 in order to extend the services to the browser client 221. The particular HTTP protocol used can be defined as required by the particular native or external service, for example, JSON, XML, XMPP, Skype protocol etc. In a preferred embodiment a JSON protocol is used for communication between client-side RTC signaling controller 222 and WSC 216 as described above.

Protocol serialization 276 interacts with protocol state view 274 and connection manger 278 to communicate with WSC 216 over Web 110. Session Control 284 establishes reliable connection with WSC 216. This session can be used by the application 270 to create or invoke other objects.

RTC signaling controller 222 comprises a JavaScript SDK 272 which provides the functions necessary for application 270 to manage server connections (connection establishment, teardown via WebSocket). The JavaScript SDK 272 provides functions necessary to handle the state machine and functions to deal with interoperability issues. For example, the JavaScript SDK 272 of application 270 provides functions to create messages or insert messages into the state machine. The JavaScript SDK 272 also provides functions for the client to monitor connection health, including the ability to reconnect in case of stale connections and the ability to synchronize state from the server and add modified state back to the server.

JavaScript SDK 272 also provides an application programming interface (API) 271 which can modify and optimize media parameters, session description protocol (SDP), etc. The API 271 abstracts out complex functionality and provides API to deal with the real-time communication session, Call etc. The API 271 provides the ability to handle call states, media states, subscriptions and notifications.

In operation, HTML5 applications 294 access the JavaScript APIs to get access to various communication objects as defined in the API 271. An HTML5 application 294 will create a session object 296. The session object 296 acts as browser side representation of the communication. From session object 296, application 270 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 290 is maintained by the browser client 221. When the browser client 221 reloads, the application 270 has no knowledge of the ICE Candidates and is forced to perform ICE restart. In order to avoid this, application 270 can save this information in WSC 216. When the initial ICE negotiation finishes, the browser client 221 sends the nominated ICE candidate pair of IP addresses to the application 270 which saves this information in WSC 216. When the browser client 221 reloads, the application 270 will fetch the nominated ICE candidate information from the server, and then send it to the browser client 221. This will tell the browser client 221 to use these candidates for media transfer. Since the browser client 221 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for extending an IP Multimedia Subsystem (IMS) of a telecommunications network to an HTML5 application on a user equipment, the system comprising:
    a computer including one or more microprocessors; and
    a network-side controller operating on the computer and connected to an IMS, wherein the IMS operates in accordance with Session Initialization Protocol (SIP), and provides one or more services accessible to the network-side controller via the SIP;
    wherein the network-side controller includes
        a data definition for mapping each of a plurality of HTTP-based protocols to the SIP, and
        an identity service that supports a plurality of identity protocols;
    wherein the network-side controller operates to
        terminate one or more signaling messages received from a client-side controller on the user equipment via a WebSocket connection, wherein the one or more signalling messages embody one of the plurality of HTTP-based protocols,
        map the HTTP-based protocol embodied in the one or more signalling messages into the SIP using the data definition, for mediation of the one or more services from the IMS to the HTML5 application on the user equipment, and
        invoke the identity service to authenticate and authorize the HTML5 application to access the one or more services.

2. The system of claim 1, wherein the client-side controller includes one or more JavaScript objects configured to manage the WebSocket connection between the HTML5 application and the network-side controller, including reconnecting in case of stale connections.

3. The system of claim 1, wherein the HTML5 application receives interactive connectivity establishment (ICE) candidate IP addresses from a browser client and saves the IP addresses to the network-side controller, wherein when the browser client reloads, the HTML5 application fetches the ICE candidate IP addresses to be used for media transfer.

4. The system of claim 1, wherein the client-side controller is placed in standby operation and shuts down a web signaling channel when there is no traffic between the client-side controller and the network-side controller.

5. The system of claim 4, wherein the network-side controller includes a push notification controller that wakes up the client-side controller to resume communication.

6. The system of claim 1, wherein the network-side controller acts as an entry point to the IMS for the HTML5 application, and interacts with a service composition controller that mediates provision of internal services and external services in response to requests of the client-side controller.

7. The system of claim 1, wherein the WebSocket connection uses a JSON-based protocol to exchange signaling messages between the client-side controller and the network-side controller.

8. A method for extending an IP Multimedia Subsystem (IMS) of a telecommunications network to an HTML5 application, the method comprising:
    providing a network-side controller on a computer including one or more microprocessors, wherein the network-side controller is connected to an IMS, wherein the IMS operates in accordance with Session Initialization Protocol (SIP) and provides one or more services accessible to the network-side controller via the SIP;
    configuring the network-side controller with a data definition for mapping each of a plurality of HTTP-based protocols to the SIP, and an identity service that supports a plurality of identity protocols;
    terminating, via the network-side controller, one or more signaling messages received from a client-side controller on the user equipment via a WebSocket connection, wherein the one or more signalling messages embody one of the plurality of HTTP-based protocols;
    mapping the HTTP-based protocol embodied in the one or more signalling messages into the SIP using the data definition, for mediation of the one or more services from the IMS to the HTML5 application on the user equipment; and
    authenticating each of the plurality of signaling messages using the identity service.

9. The method of claim 8, wherein the client-side controller includes one or more JavaScript objects configured to manage the WebSocket connection between the HTML5 application and the network-side controller, including reconnecting in case of stale connections.

10. The method of claim 8, wherein the HTML5 application receives interactive connectivity establishment (ICE) candidate IP addresses from a browser client and saves the IP addresses to the network-side controller, wherein when the browser client browser client reloads, the HTML5 application fetches the ICE candidate IP addresses to be used for media transfer.

11. The method of claim 8, wherein the client-side controller is placed in standby operation and shuts down a web signaling channel when there is no traffic between the client-side controller and the network-side controller.

12. The method of claim 11, wherein the network-side controller includes a push notification controller that wakes up the client-side controller to resume communication.

13. The method of claim 8, wherein the network-side controller acts as an entry point to the IMS for the HTML5 application, and interacts with a service composition controller that mediates provision of internal services and external services in response to requests of the client-side controller.

14. The method of claim 8, wherein the WebSocket connection uses a JSON-based protocol to exchange signaling messages between the client-side controller and the network-side controller.

15. A non-transitory computer-readable storage medium storing a set of instructions for extending an IP Multimedia Subsystem (IMS) of a telecommunications network to an HTML5 application, the instructions, when executed by one or more processors, causing the one or more processors to perform the steps comprising:

providing a network-side controller on a computer including one or more microprocessors, wherein the network-side controller is connected to an IMS, wherein the IMS operates in accordance with Session Initialization Protocol (SIP) and provides one or more services accessible to the network-side controller via the SIP;

configuring the network-side controller with a data definition for mapping each of a plurality of HTTP-based protocols to the SIP, and an identity service that supports a plurality of identity protocols;

terminating, via the network-side controller, one or more signaling messages received from a client-side controller on the user equipment via a WebSocket connection, wherein the one or more signaling messages embody one of the plurality of HTTP-based protocols;

mapping the HTTP-based protocol embodied in the one or more signaling messages into the SIP using the data definition, for mediation of the one or more services from the IMS to the HTML5 application on the user equipment; and     authenticating each of the plurality of signaling messages using the identity service.

16. The non-transitory computer-readable storage medium of claim 15, wherein the client-side controller includes one or more JavaScript objects configured to manage the WebSocket connection between the HTML5 application and the network-side controller, including reconnecting in case of stale connections.

17. The non-transitory computer-readable storage medium of claim 16, wherein the WebSocket connection uses a JSON-based protocol to exchange signaling messages between the client-side controller and the network-side controller.

18. The non-transitory computer-readable storage medium of claim 15, wherein the client-side controller includes one or more JavaScript objects configured to manage connections between the HTML5 application and the network-side controller, including reconnecting in case of stale connections.

19. The non-transitory computer-readable storage medium of claim 15, wherein the HTML5 application receives interactive connectivity establishment (ICE) candidate IP addresses from a browser client and saves the IP addresses to the network-side controller, wherein when the browser client browser client reloads, the HTML5 application fetches the ICE candidate IP addresses to be used for media transfer.

20. The non-transitory computer-readable storage medium of claim 15, wherein a client-side controller is placed in standby operation and shuts down the web signaling channel when there is no traffic between the client-side controller and the network-side controller.

21. The non-transitory computer-readable storage medium of claim 20, wherein the network-side controller includes a push notification controller that wakes up the client-side controller to resume communication.

22. The non-transitory computer-readable storage medium of claim 15, wherein the network-side controller acts as an entry point to the IMS for the HTML5 application, and interacts with a service composition controller that mediates provision of internal services and external services in response to requests of the client-side controller.

\* \* \* \* \*

UNITED STATES PATENT AND TRADEMARK OFFICE
CERTIFICATE OF CORRECTION

| | |
|---|---|
| PATENT NO. | : 9,648,049 B2 |
| APPLICATION NO. | : 14/069214 |
| DATED | : May 9, 2017 |
| INVENTOR(S) | : Gangadharan et al. |

Page 1 of 1

It is certified that error appears in the above-identified patent and that said Letters Patent is hereby corrected as shown below:

On the Title Page

On page 2, Column 2, under Other Publications, Line 2, delete "Architecutre," and insert -- Architectures, --, therefor.

In the Specification

In Column 2, Line 67, delete "HTML5," and insert -- HTML5. --, therefor.

In Column 5, Line 54, delete "122" and insert -- 123 --, therefor.

In Column 6, Line 12, delete "initiation" and insert -- Initiation --, therefor.

In Column 6, Line 33, delete "client-sideJavaScript" and insert -- client-side JavaScript --, therefor.

In the Claims

In Column 14, Line 45, in Claim 10, delete "browser client browser client" and insert -- browser client --, therefor.

In Column 16, Line 15, in Claim 19, delete "browser client browser client" and insert -- browser client --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*